United States Patent [19]

Lu

[11] Patent Number: 5,341,290
[45] Date of Patent: Aug. 23, 1994

[54] MODULAR SYSTEM FOR PRINTING AND PROCESSING FINANCIAL DOCUMENTS

[76] Inventor: James Lu, 628 Rte. 10 S., Whippany, N.J. 07981

[21] Appl. No.: 945,254

[22] Filed: Sep. 15, 1992

[51] Int. Cl.⁵ .......................................... G06F 15/21
[52] U.S. Cl. ..................................... 364/408; 235/379; 235/432
[58] Field of Search ....................... 364/401, 406, 408; 235/379, 432; 902/18, 36; 283/58, 59

[56] References Cited

U.S. PATENT DOCUMENTS

| | | | |
|---|---|---|---|
| 4,385,285 | 5/1983 | Horst et al. | 235/379 |
| 4,459,052 | 7/1984 | Lundblad | 235/379 |
| 4,623,965 | 11/1986 | Wing | 364/408 |
| 4,810,866 | 3/1989 | Lord, Jr. | 235/432 |
| 4,948,174 | 8/1990 | Thomson et al. | 283/58 |
| 5,014,212 | 5/1991 | Smith | 235/432 |
| 5,221,838 | 6/1993 | Gutman et al. | 235/379 |
| 5,241,464 | 8/1993 | Greulich et al. | 364/401 |

Primary Examiner—Robert A. Weinhardt
Attorney, Agent, or Firm—Bacon & Thomas

[57] ABSTRACT

A financial system for processing and printing financial documents takes the form of a professional financial workstation capable of multiple system tasks including financial applications, security operations, and networking. The system further supports the general functions of financial document typesetting, printing, data processing, and data management to provide a complete automatic financial service system. The system is modular in design, including a control module and an operation module, and a database. The control module includes a high speed image output device, a database/networking controller, a synchronous power supply, an electronic lock, a system real-time recorder, an authorization card, an identification card, and a removable high capacity storage device. The operation module includes a display, an operation processor, a financial keyboard, an optical scanner, and a magnetic ink character reader/magnetic reader. The system is capable of running control software designed according to the theory of the finite state machine, and covers all possible states during operation. In application, the system can be extended by configuring a plurality of control modules and operation modules to form an extended model of a financial system.

2 Claims, 8 Drawing Sheets

MODULAR SYSTEM FOR PRINTING AND PROCESSING FINANCIAL DOCUMENTS

BACKGROUND OF THE INVENTION

The present invention relates to a financial service system for printing and processing financial documents, and more particularly to a professional financial workstation with full financial functions of system task applications, security operation, and networking capability. The system further supports general functions of financial document type setting, printing, data processing, and management to provide a complete automatic financial service system.

Financial service activities are increasingly important to both the public and business, in both industry and commerce. However, the conventional financial system used in most current bank organizations does not meet demands, because of limitations in hardware capability and software function. For example, the function of processing and managing customized cheques is obviously insufficient. The drawbacks of the conventional financial service system may be listed as follows:

1. Because of the limitations of the financial system both in hardware configuration and software capability, the financial system can not print the title, address, company registration number, or identity card number of the cheque account during printing the cheque. Also, it can not process the customer's identification trademark, logo, and particular character pattern.
2. When the cheque account applies for bank cheque, the cheque number is not in series.
3. The bank's clerk must waste much time and labor in cheque preparation, cheque management, cheque record, and counting operation.
4. When the cheque account applies for a chequebook, the bank's clerk must manually stamp the account numbers on each cheque. In addition, the bank's clerk must input the account number by means of a MICR (Magnetic Ink Characteristic Reader). Obviously, it will waste much time and labor.
5. When the bank a issues Cashier's cheque, the bank's clerk have to manually process and manage the financial documents.
6. The bank always transfers the work and responsibility of printing the chequebook to contractors. Therefore, the quality of the financial documents is not guaranteed.
7. The existing financial system only has the ability of printing simple cheque styles and cheque forms.
8. The bank can not provide the function of processing customized financial documents.
9. The customer can not get a customized cheque style.

It is believed that the drawbacks listed above are only a part of the problems found in the current practice. Many other problems may be encountered.

SUMMARY OF THE INVENTION

In view of the problems found in the prior art, the primary object of the present invention is to provide a professional financial service system for automatically printing and processing desired financial documents. The system is capable of managing various financial applications to meet the requirements of practical use. The advantages of the present invention may be listed as follows:

1. various system task modules with independent functions:
   The system of the present invention supports various system task applications such as type setting, form designation, printing operation, data creation, data management, and so on.
2. various Chinese/English character styles:
   Chinese: Sung font, Text font, Ming font, Li font, Bold font, and so on:
   English: Ming font, Roman font, Bold style, Script style, and so on; and
   special effects: Italic, Shadow, Screen, inverse, highlight, quad, and so on.
3. complete printing capability:
   The customer's name, address, identification number, trademark, and another identification symbols may be printed on the cheque for identification.
4. establishment of the customer's cheque series number:
   The customer applied cheques may be given a series of continuous cheque numbers for easy management.
5. auto MICR function:
   The MICR facilitates the use of the system.
6. various system task modules:
   The system provides various system task modules for facilitating management of cheque, bill, bond, and other financial documents.
7. networking operation:
   The system may communicate with a computer center or another same type financial system.
8. off-line operation:
   The system may performed off-line operations. In such an operation mode, the information may be inputted by means of a floppy disk or optical disk.
9. uninterruptible power supply:
   The system is equipped with an uninterruptible power supply for emergency operation.
10. capability of processing specific character font and graph:
    The system is capable of storing and printing the customer's trademark, handwriting character, and graph in database.
11. extendible high capacity storage device:
    The storage capacity may be expanded to 360 MB for storing a large amount of data. An optical disk may be used in the system.
12. high security:
    The system is equipped with an electronic lock and other associated security devices. Only an operator who passes the identification and authorization check may use the system. The operation statuses of the system during operation is promptly recorded in a real time system recorder.
13. automatic service functions:
    The system may automatically print customized financial documents for the customer, which may save a large amount of time, labor, and cost.
14. no safekeeping of the cheque is needed:
    The bank is not necessary to saftkeep a large amount of blank cheques, so it is possible for the bank's clerk to save time and labor.
15. automatic MICR recording function:
    The customer's information may be inputted by means of the MICR to simplify the operation.
16. high reliability and accuracy:
    Financial documents such as customer cheques, transfer credits, clearing credits, salary transactions, and collection cheques are processed and printed with high reliability and accuracy.

17. professional financial service system:

The system is designed to facilitate the financial document operation, and has advantages of high security and reliability.

The other objects and features of this invention will become more fully apparent and readily understood from the following description together with the accompanying drawings. While the circuit arrangement and illustrations herein described constitutes a preferred embodiment of this invention, it is to be understood that the present invention is not limited to this precise form and that changes may be made therein without departing from the scope and spirit of the invention as defined in the appended claims.

DETAILED DESCRIPTION OF THE INVENTION

Figure 1:
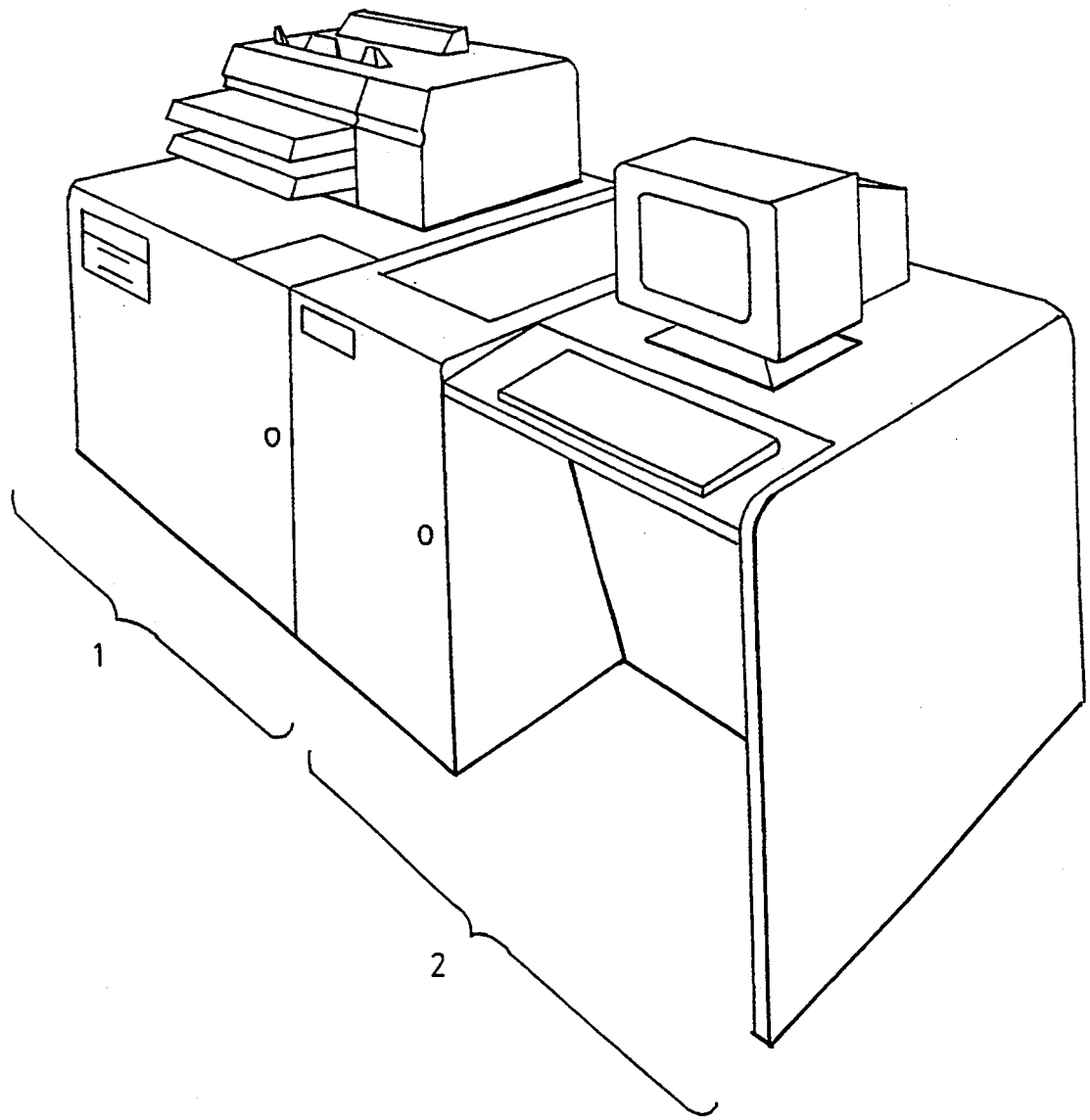
FIG. 1 shows a perspective view of a preferred embodiment of the present invention.

FIG. 1 is a perspective view of the preferred embodiment in accordance with the present invention. This embodiment is made up of a control module 1 and an operation module 2, commonly forming a basic configuration of the financial service system of the present invention. In practical application, a plurality of control modules and/or operation modules may be employed to configure an extended system to meet practical requirements.

Figure 2:
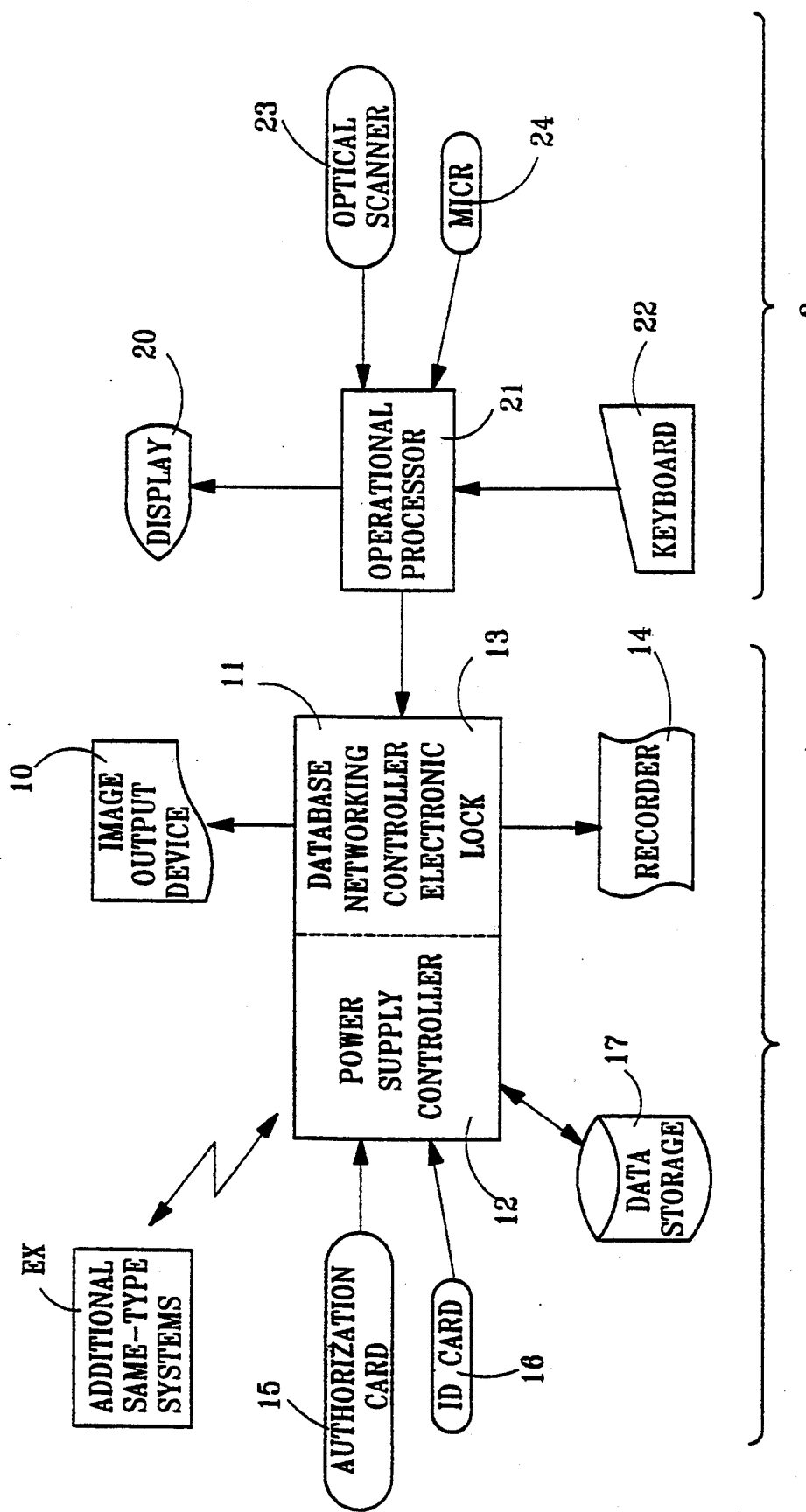
FIG. 2 is block diagram schematically showing the hardware configuration of the present invention, which is mainly composed of a control module and an operation module.

FIG. 2 shows the hardware configuration of the control module 1 and the operation module 2 shown in FIG. 1. The control module 1 is made up of a high speed image output device 10, a database/networking controller 11, a synchronous power supply controller 12, an electronic lock 13, a system real-time recorder 14, an authorization card 15, an account identification card 16, and a removable data storage device 17. The operation module 2 mainly composes of a display 20, an operation processor 21, a financial keyboard 22, an optical scanner 23, and a magnetic ink character reader (abbreviated MICR) 24. Based on this basic hardware configuration, the control module 1 may communicate with a remote computer center or another set of the same type financial system EX through wiring connections forming a network configuration in order to exchange data and a establish networking operation.

The following is a disclosure of the control module and operation module in more detail.

Firstly, the database/networking controller 11 of the control module 1 serves as a main processing unit capable of managing the database and networking operation of the system. That is, the database/networking controller 11 may create, update, delete, search, and backup the data in the database. As to the functions of the networking operations, the database/networking controller 11 is capable of efficiently performing the networking operations between the associated operation processor, the same type extended system, and the computer center. The database/networking controller 11 combined with the electronic lock 13, the synchronous power supply controller 12, and the system real-time recorder 14 commonly forms a tight configuration ensuring the security and reliability of the system. In an alternative embodiment of the present invention, the database/networking controller 11 may be composed of a plurality of central processing units to form a multiple processing system.

Figure 3:
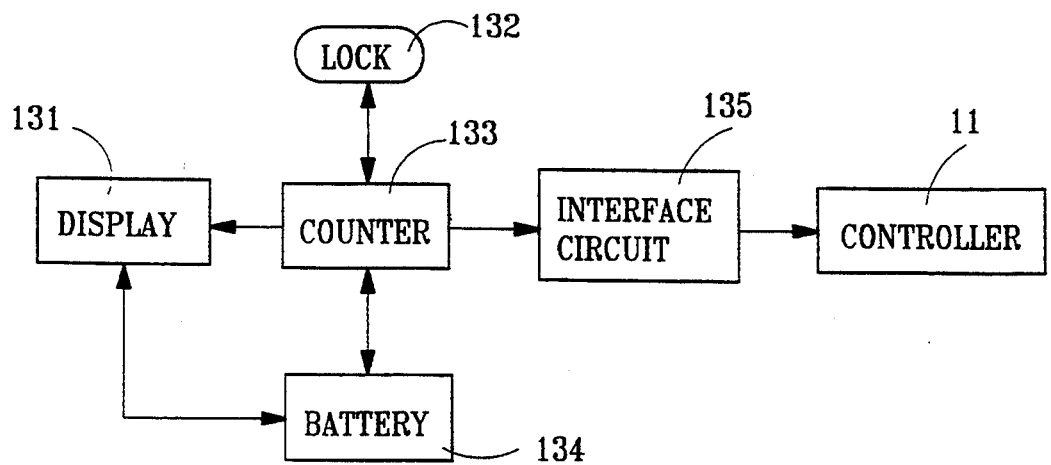
FIG. 3 is a functional block diagram of the electronic lock contained in the control module shown in FIG. 2.

FIG. 3 is a functional block diagram of the electronic lock 13 of the present invention, which is composed of a lock sequential number display 131, a mechanical lock 132, an electronic counter 133, a built-in battery 134, and an interrupt interface circuit 135. The electronic lock may send an interrupt signal to the database/networking controller 11 via the interrupt interface circuit 135 upon being triggered. The electronic lock will automatically increase the count of the electronic counter 133 operated by the built-in battery 134 every time the machine is accessed by anyone. At the same time, the interrupt interface circuit 135 will send an interrupt signal to the database/networking controller 11 and display 31 will display the corresponding count number. Every time the database/networking controller 11 receives an interrupt signal from the interrupt interface circuit 135, it will promptly record the signal into the database and thus the total access to the database. When the system is turned on the next time, the sequential number recorded in the database is verified. The recorded number in the electronic counter can not be reset externally for security reasons.

Every time an interrupt signal is sent to the database/networking controller from the interrupt interface circuit, regardless of whether the system is in an on-line or off-line status, the sending of the signal will be recorded in the database. The next time the system is turned on, the initialization process of the system software will first verify the operator's authentication, for example, by a user's identification and password check. Only after the operator passes the authentication check will the system compare current counter readings with the readings saved from the last power-down. If the difference between the two readings does not match to the expected result, a red video alarm will be flashed on the system console and at the same time an audio alarm will be activated to warn of a potential system break-in.

Customers will have a means either to disable the system at this point until appropriate managerial actions are taken, or to ignore the warning and proceed with the operation.

Figure 4:
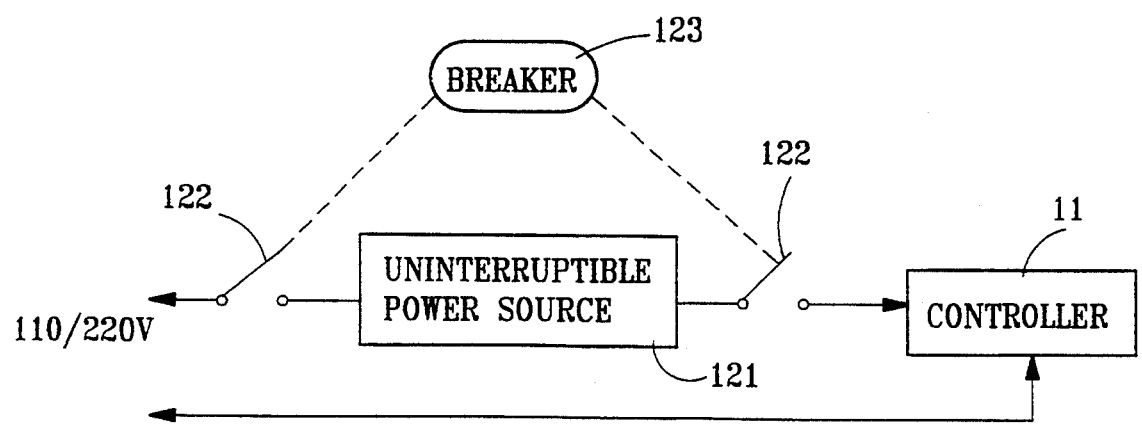
FIG. 4 is a functional block diagram of the synchronous power supply controller contained in the control module shown in FIG. 2.

FIG. 4 shows the hardware configuration of the synchronous power supply controller of the present invention. It is well-known that the conventional uninterruptible power supply (known as UPS) is capable of providing an emergency power source to an electrical device in case the normal AC power source is in fault condition. Typically, the time that the UPS can supply is about 10–15 minutes for critical operations. However, the conventional UPS only provides a simple function. When the normal power source is supplied again, the operator must unplug the electrical devices plugged into the UPS. Otherwise, the charge energy stored in the battery set of the UPS will be discharged continually. Once the charge energy of the UPS is fully discharged, the battery set of the UPS must be recharged for 8–12 hours. In addition, the conventional UPS can not prevent illegal power on and off operations. In order to overcome the problems of the prior art, the present invention is equipped with a synchronous power supply acting as an uninterruptible power source. The synchronous power supply is composed of an uninterruptible power source 121, a synchronous power switch 122 and an operating switch or breaker 123 with a mechanical lock which serves as a control switch for turning on or off the machine manually. The synchronous power switch 122 is used to automatically switch off all electrical devices from the UPS to prevent the battery set in UPS from discharging charge energy to the plugged electrical devices when the power supply is in normal condition. In case the AC 110/220 V power source is interrupted, the uninterruptible power source 121 will automatically supply emergency power source to the system. Preferably, the present invention is equipped with an interrupt condition alarm device for responding to the supplying condition of the power supply.

The image output device 10 may be a high speed laser printer for printing financial documents such as a cheque, a bill, and a receipt. The image output device may be additionally equipped with a cartridge slot including a cartridge interface for receiving the customer's authorization card and reading the information contained in the authorization card. In operation, when an customer's authorization card is plugged into the cartridge slot of the image output device, the system will receive the information in the authorization card via the cartridge interface and then print the related information on the financial documents. The laser printer is controlled by the database/networking controller via a printer control interface for performing a printing operation. Also, a set of fresh image data may be down loaded to the customer's authorization card via the printer control interface under the control of the database/networking controller.

In application, the owner of the authorization card may store his demands and related information such as account number and impression image into the authorization card by means of a specific writing interface card (not shown). When the band's clerk receives the customized authorization card, he may simply plug the authorization card into the cartridge slot of the image output device, so that a customized financial document is printed under the control of an image processing software of the system. In such a case, the user first stores a specific message such as a count number, stamp image, and sheet number to the authorization card via an interface circuit (not shown), and then the operator of the bank may print the financial documents specified by the customer. In another application, the manager of the bank may give various commands to different clerks by means of the authorization card. In another application of the authorization card, the manager of the bank may assign an appointed work to a specific clerk via the authorization card.

The identification card 16 contains an customer's IC card, an IC card reader, and a real-time financial document printing software. When a customer establishes an account, the bank's clerk will store the LOGO, the impression of customer's seal, and the customer account number into the IC card and then pass the IC card to the customer. After these processes, the customer may print his desired cheque by himself in the other appointed financial service systems. In operation, when the customer inserts the IC card into the IC card reader of the system, the system will first verify the identified information of the IC card. Upon proof of the identity, the system can automatically print the customized financial documents.

The system real-time recorder 14 is capable of recording all the operation statuses and procedures of the system. Every time the system is accessed, all the related messages such as the identified code, instruction commands, and operation status will be automatically recorded in the system real-time recorder 14 in real-time. The messages recorded in the recorder 14 may be printed out for verification purposes. Preferably, the system real-time recorder 14 is contained in a secure box with a lock, and the secure box is preferably provided with a transparent view window at a suitable position for examination.

The operation module of the present invention functions as a data pre-processing device for the control module. The operation module also acts an interfacing unit between the operator and the control module. Any information such as operating instructions, prompts, and operation results from input devices or output devices are pre-processed by the operation module before entering into the control module. Upon performing database operations, the operation module is operated in a networking operation mode for communicating with the control module to access data in the database. It is possible to extend the system by including additional operation modules.

The operation module is equipped with a display 20 for promptly displaying operation steps, prompts, and results. The display is also capable of displaying account information such as the title of account and account number during the processes of account management.

The operation module is equipped with various input devices, such as an optical scanner 23, MICR 24, financial keyboard 25. The customer's data and image data such as impression of seal may be inputted into the database by means of the optical scanner 23. Preferably, the scanning density of the optical scanner 23 is 300 dots per inch. The digital image data scanned by the optical scanner is first stored in an image memory area under control of the image processing software of the system. The scanned digital image data may be made larger or smaller, if needed, to match necessary financial document forms. Finally, the processed image data may be compressed by digital data compression techniques which are well known to those skilled in this art for saving memory space.

Figure 5:
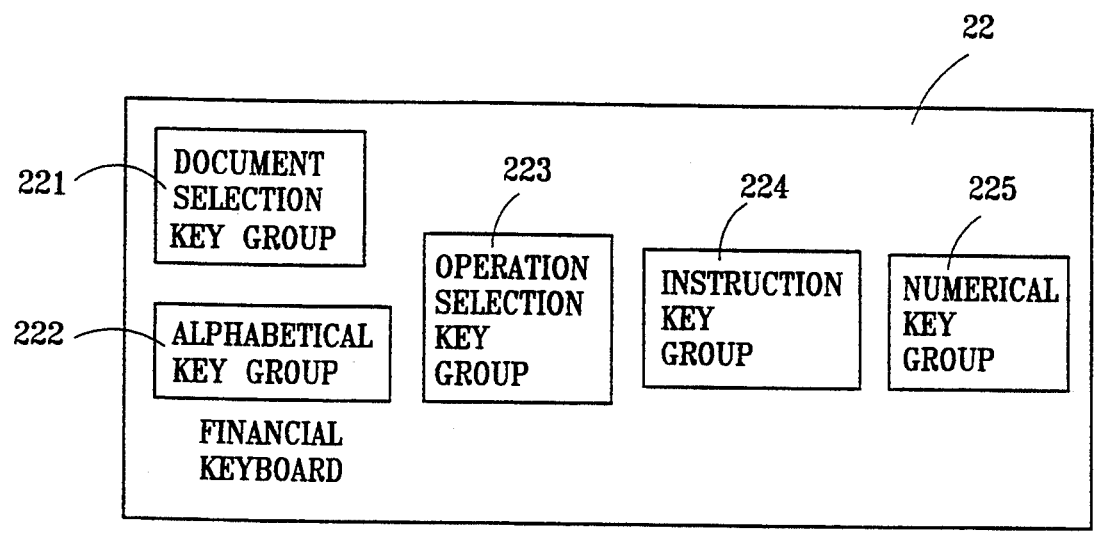
FIG. 5 illustrates the arrangement of the financial keyboard of the operation module shown in FIG. 2.

The financial keyboard 22 of the operation module is especially designed to meet the requirements of financial practice. The key arrangement of the keyboard is shown in FIG. 5 in accordance with the preferred embodiment of the present invention, and includes five groups: a document selection key group 221, an alphabetical key group 222, an operation selection key group 223, an instruction key group 224, and a numerical key group 225. The document selection key group 221 is composed of a plurality of document selection keys for selecting desired financial document. Each selection key in the document selection key group 221 is independently mapped to a specific financial document. Upon selection of a particular key, the selected item and operation procedure will be displayed on the display device 20. The operator may key in Chinese, English, and relative symbols by means of operation of the alphabecal key group 222. Operation selection key group 223 is composed of a plurality of operation keys, providing further operating functions for the appointed financial document. The instruction key group 224 is composed of a plurality of instruction keys allowing the operator to input desired instructions to the system. Numerical key group 225 is composed of a plurality of numerical keys for allowing the operator to input numerical data such as account number and amount. The financial keyboard of the present invention is designed to meet the requirements of financial practice, so that it has advantages of easy use, easy learning, high accuracy, and high security.

In the preferred embodiment of the present invention, the system is equipped with an MICR 24 which is capable of conveniently reading the magnetic ink characters to simplify the data key in operation and save time.

The system software modules of the present invention are described as follows.

The system software is based on the theory of the finite state machine. All possible situations and processes during practical operations are considered completely in order to ensure the security and extendibility of the system.

Figure 6:
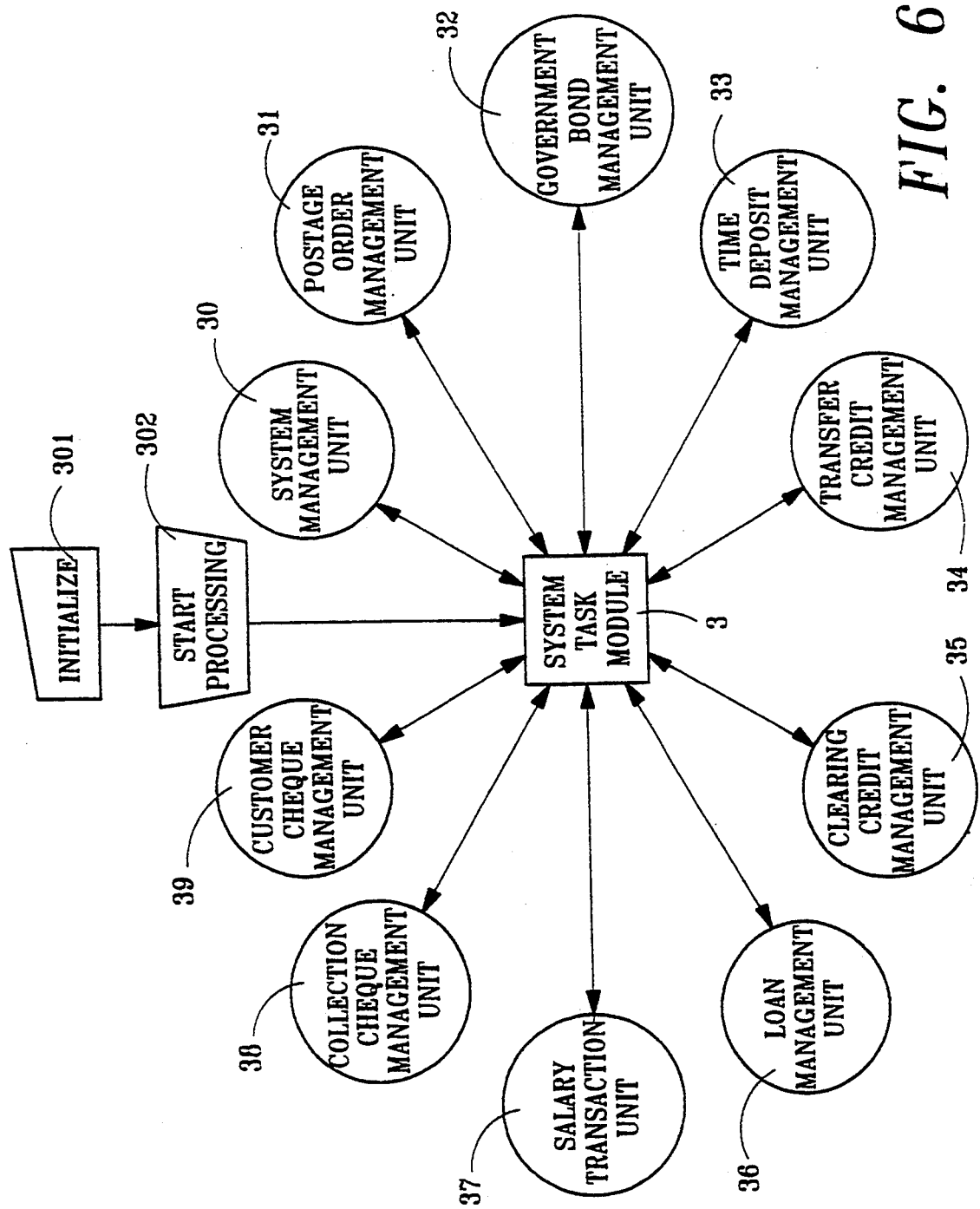
FIG. 6 schematically illustrates the software module of the present invention, which includes various application software modules surrounding a central system task module.

FIG. 6 schematically illustrates the state machine modules of the system software in accordance with the present invention, in which each of the state machine modules has its particular purpose and is independent of the others in function. That is, each of the necessary financial functions is considered as an independent unit and is controlled by a corresponding state machine module. The state machine modules of the present invention may include a system management unit 30, a postage order management unit 31, a government bond management unit 32, a time deposit management unit 33, a transfer credit management unit 34, a clearing credit management unit 35, a loan management unit 36, a salary transaction unit 37, a collection cheque management unit 38, and a customer cheque management unit 39. All of the state machine modules above have initial and final states in which they communicate with the system task module 3 of the system, while entrance to the system task module 3 is through initialization step 301 and start processing step 302. A new management unit may be added to the system task module 3, forming an independent operable financial unit. Similarly, any one of the current management units of the system may be deleted from the system task module without affecting any of the other management units.

In order to support the system task module of the system, the present invention is further provided with the following utilizable software modules:
1. An image input software module for processing image data input, compression, and encoding transactions;
2. A database processing software module for processing the creation, storage, lookup, and backup operations of the system database;
3. An image identification software module for identifying image data;
4. An image output software module for processing data decompression, inversion, and image output; and
5. A real-time system task management software module.

Each of the software modules listed above will be described in more detail as follows.

The image input software module is capable of performing complete type-setting function for arranging the image data which may be inputted to the image input software module by means of an optical scanner. The inputted image data is in the form of a digital image representation and may be compressed by conventional data compression techniques. The compressed image data is the stored in the database of the system for access. In order to facilitate preparation of a complete financial document, the present invention provides a two-phase approach in this software module. The two phases take the form of a generic document preparation processing module and a customer document preparation processing module. The generic document preparation processing module provides an interactive graphics editor to allow the operator to prepare desired generic financial documents. The generic documents, for example, contain information related to the operator's specific financial institute such as bank name, branch name and account number, bank logo, and MICR information. The customer document preparation processing module provides interactive software for obtaining customer information for a new account. The information may contain the customer's name, address, telephone numbers, tax identification, selected cheque style, logo, photo, or hand scripts. The information will then be saved in the system database for later use to produce actual documents by the laser printer.

The database processing software module provides creation, change, lookup, and backup operations for the system database. Preferably, each of the financial system task modules has its own database area for purposes of rapid-access operation and for considerations of security, reliability, and independence of the database. In addition, the database processing software module further provides an automatic backup operation which automatically backups the data in the database. In practice, the manager of the system may pre-set a backup time period, for example a period of six months, for automatically performing the backup operation.

The image identification software module provides two methods for discriminating the legal identification between two images. The typical image data to be discriminated is a signature or seal impression image. In this module, the first method is a superimposed enlarging comparison method, which first enlarges the seal impression image stored in the database and displays the enlarged image on the display of the system. Thereafter, the image of a second seal impression is scanned by a scanner and superimposed onto the display to try to match the first image, so that the bank's clerk can determine whether the two seal impressions are consistent or not. A second method available to discriminate the two seal impressions is electronic counting comparison method. In this method, both the seal impression stored in the system database and the seal impression to be discriminated are first enlarged to the same image scale. Then, an image comparison software routine is employed to discriminate the differences between the two seal impressions by comparing each pixel representation, and finally a percentage of variation is obtained. If the variation is greater than a predetermined percentage, it is determined that the two seals are inconsistent.

The image output software module functions as an image data output processing module capable of decompressing the stored image data, inversing the angle of the image, and printing out the image via a laser printer. The software module is also capable of writing related information into the the authorization card. Upon request, this software module will generate a complete customized financial document by extracting information from a generic document and customized document database as discussed above. The all-over document is printed by the laser printer at high speed. This capability eliminates preprinted financial documents such as preprinted cheques, which increases security and reduces supply and inventory costs.

The real time system task management software module provides the function of allowing the bank manager to create or delete any one of the system task management units shown in FIG. 6. Such a capability greatly enhances the security of the system, and simplifies the operating procedures. In addition, this software module further provides a real time self-service capability. That is, the system provides a real time task with tight security measures for allowing customers to print their own customized financial documents such as personal cheques. A magnetic strip or IC card reader in combination with system software will guard against any potential security breach.

Figure 7:
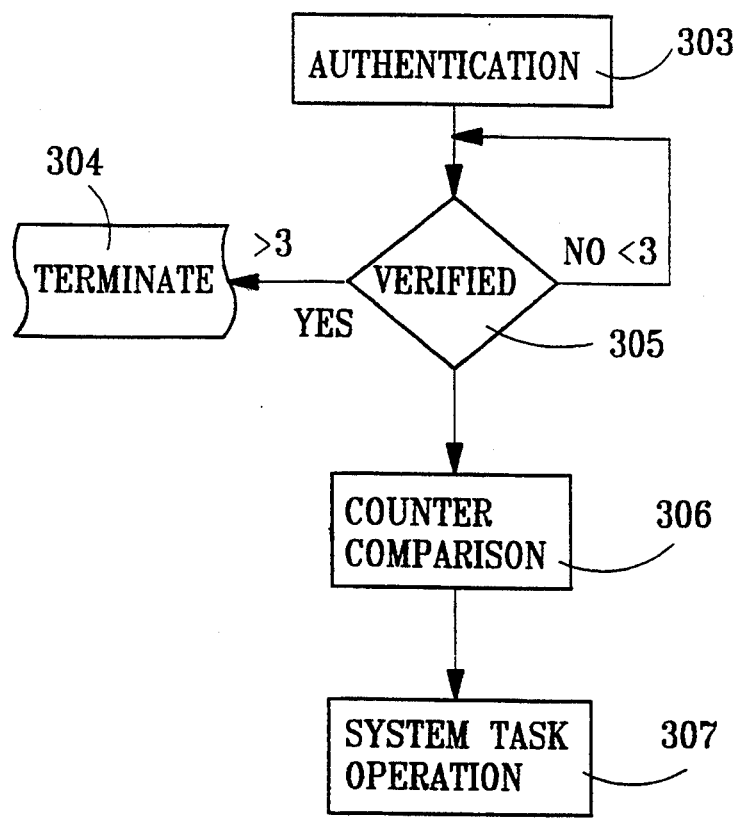
FIG. 7 is a flow diagram illustrating the greater detailed procedures of the start processing step of the system software shown in FIG. 6.

The start processing step 302 shown in FIG. 6 is used for preventing illegal use of the system and ensuring the normal performance of the system. FIG. 7 is a flow diagram illustrating the detailed procedures of the start processing step 302. On power up, system software will first perform an authentication verification step 303 which verifies operator's credentials such as user's identification and password check. Only after the operator passes the authentication check step 305 will the system perform the counter reading comparison step 306 which compares current counter readings stored in the electronic lock with the readings saved from last power-down. If the two counter readings match an expected result, a system task operation step 307 is performed permitting the operator use of the system. In the authentication check step 305, the operator has three chances to pass the authentication check. If the operator enters an incorrect authentication number in excess of three times, the system will perform the termination step 304 to promptly halt the system and record the operation status in the real time system recorder indicated at 14 in FIG. 2.

Furthermore, in the counter reading comparison step 306, if the difference between two counter readings does not match the expected result, an alarm (not shown) will be flashed on the system console and at the same time an audio alarm will be activated to warn of a potential system break-in. Customers will have a means either to disable the system at this point, until appropriate managerial actions are taken, or to ignore the warning and proceed with the operation.

Figure 8:
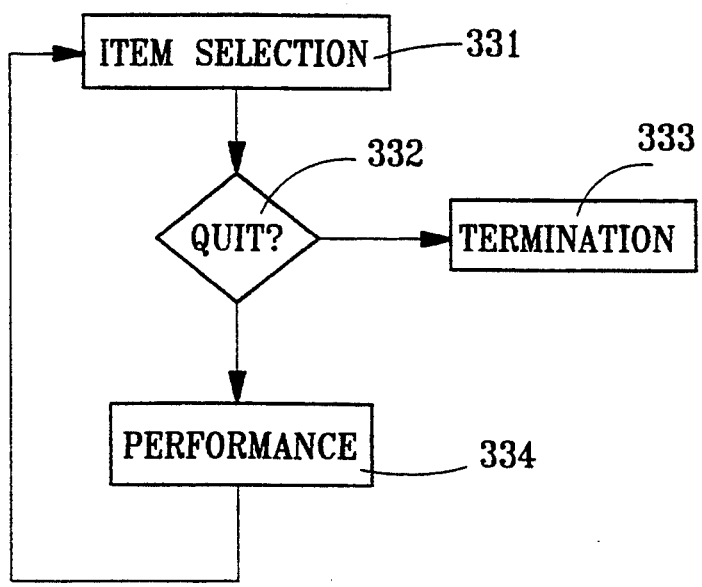
FIG. 8 is a flow diagram illustrating the greater detailed procedures of the system management unit of the system task module shown in FIG. 6.

FIG. 8 further shows the operational flow chart of the system management unit 30 which is a sub-system of the system task module 3 shown in FIG. 6. As shown in FIG. 8, the management unit includes an item selection step 331, a decision step 332, a termination step 333, and a performance step 334. The item selection step 331 of this unit provides functions of operator authorization management, system data backup management, application system task management, daily report management, and so on. The operator may select a desired item from the management items available. The decision step 332 is capable of judging the operator selected item and starting the item in the step 334 perform the specific item selected by the operator. In case the decision step 332 receives a quit instruction from the operator, the termination step 333 will be performed to exit this subsystem.

The available function of operator authorization management of the item selection step 331 is provided for the purpose of system security. That is, only the authorized operators recorded in the system may enter the item selection system. The record of the authorized operators may be added to or deleted from the system by a manager of the system at any time. The system is equipped with a storage device with high memory capacity for storing the backup data. In consideration of safety and economic factors, the system preferably back ups the important information stored in the database every three months.

Figure 9:
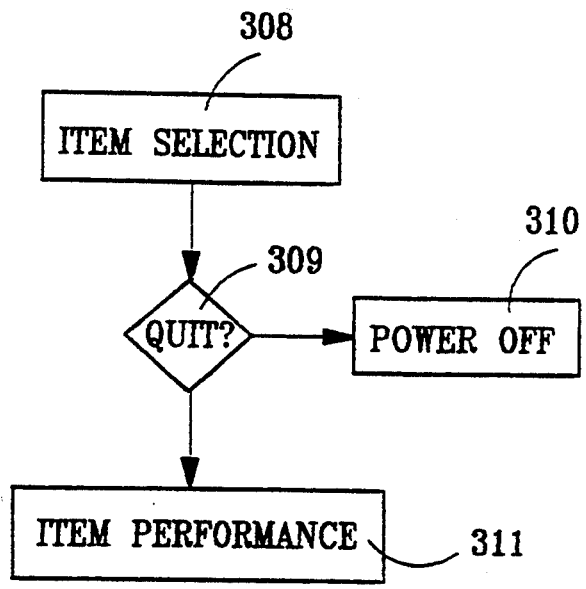
FIG. 9 is a flow diagram illustrating the system task module shown in FIG. 6 in greater detail.

FIG. 9 is an operational flow chart of the system task module 3 of FIG. 6. As shown in FIG. 9, the system task module includes an item selection step 308, a decision step 309, a power off step 310, and a performance step 311. In the standard model of the financial service system of the present invention, the system task module 3 includes ten standard financial application units contained in the item selection step 308. That is, the item selection step 308 provides standard financial application units for customer cheque management, collection cheque management, salary transactions, loan management, clearing credit management, transfer credit management, time deposit management, government bond management, postage management, and system management. The operator may select a desired item from the management items listed above. A judgment step 309 is capable of judging whether the operator has selected an item and starting the item (step 311) by performing the specific item selected by the operator, unless step 309 receives a quit instruction from the operator, in which case a termination step 310 will be performed to turn off the system.

Figure 10:
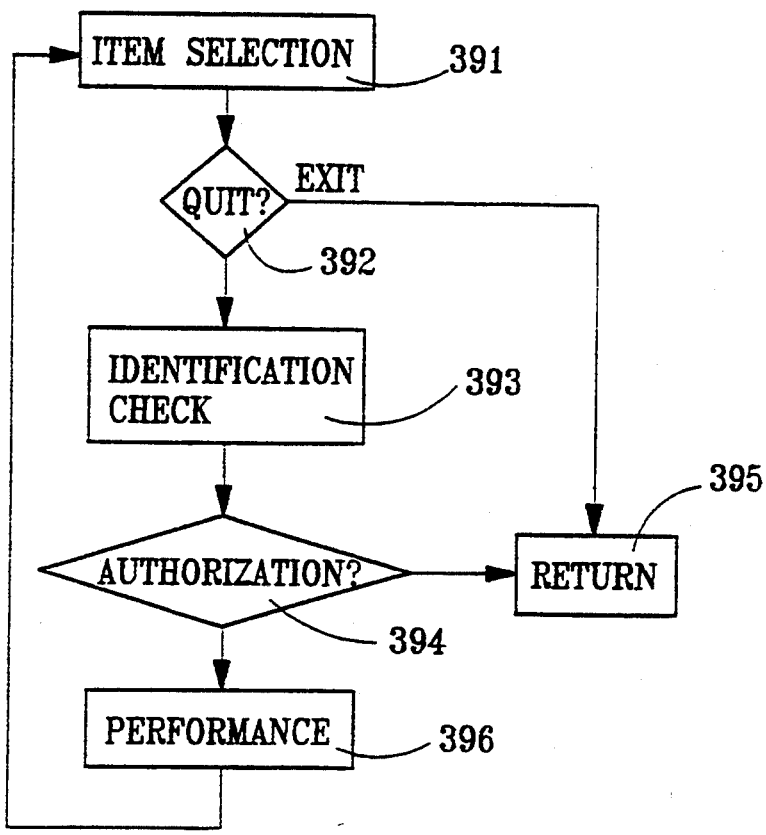
FIG. 10 is a flow diagram illustrating the customer cheque management unit of the system task module shown in FIG. 9 in greater detail.

An operational flow chart for the customer cheque management unit contained in the item selection step 308 of the system task module shown in FIG. 9 is illustrated in FIG. 10. As shown in FIG. 10, the customer cheque management unit includes an item selection step 391, a decision step 392, an identification check step 393, an authorization check step 394, a return step 395, and a performance step 396. The item selection step 391 contains various available items for establishing an account, printing financial documents, changing a data record, searching a file, and viewing the daily reports. If step 392 receives a quit instruction from the operator, the return step 395 will be performed to return to the system. In case the operator selects an item but fail to pass the identification check step 393 and the authorization check step 394, the return step 395 is also performed to return to the system. Only if the operator passes the identification check and the authorization check can the performance step 396 be performed to carry out the operator selected item.

To establish a new account in the item selection step shown in FIG. 10, various methods are available. For example, related information for the new account may be input by means of a remote computer center in on-line or off-line operation, a financial keyboard, an optical scanner, or floppy disk. The customer's information is preferably compressed and then stored in the database of the system. Each record of the database contains particular information such as the customer's name, address, ID number or company registration number, telephone number, facsimile number, account number, cheque series number, registration date of seal impression or signature, cheque style, company's trademark, compressed image of seal impression or signature, etc.

Figure 11:
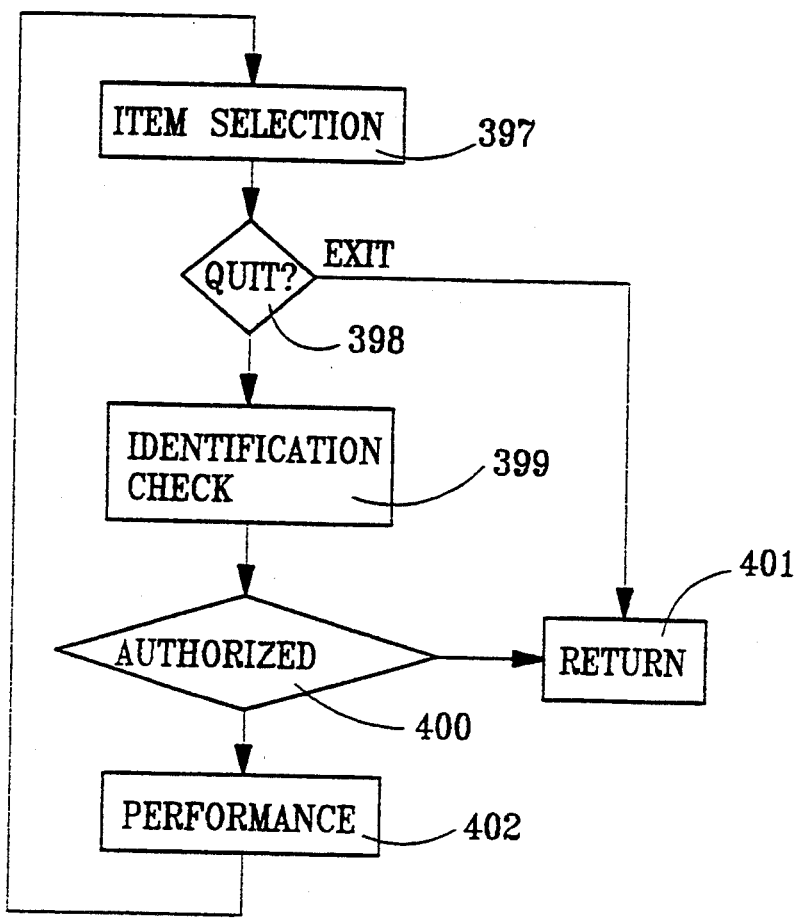
FIG. 11 is a flow diagram illustrating the collection cheque management unit of the system task module shown in FIG. 9 in greater detail.

An operational flow chart of the collection cheque management unit contained in the item selection step 308 of the system task module shown in FIG. 9 is illustrated in FIG. 11. As shown in FIG. 11, the collection cheque management unit includes an item selection step 397, a decision step 398, an identification check step 399, an authorization check step 400, a return step 401, and a performance step 402. The item selection step 397 contains various available functions for establishing an account, printing a financial document, changing a record, searching a file, viewing a daily report, and so on. The operator selected item from the item selection step 397 will be judged by the decision step 398. If the decision step 398 receives a quit instruction from the operator, the return step 401 is performed to return to the system. In case the operator selects an item but fails to pass the identification check step 399 and the authorization check step 400, the return step 401 is also performed to return to the system. Only if the operator passes the identification check and the authorization check is it possible to carry out performance step 402 and perform the operator selected item.

The first two standard financial application units of the item selection step 308 of the system task module shown in FIG. 9 are further disclosed above. The procedures of the remaining eight standard financial application units of the system task module are similar to that of the first two units. Accordingly, those skilled in the art would be enabled to use this invention according to the above detailed description, although various changes and modifications may also be made therein without departing from the scope and spirit of the invention as defined in the appended claims.

I claim:

1. A system for printing and processing financial documents, comprising:
a control module, an operation module, and a database,
wherein the control module includes:
a database/networking controller which includes means for managing the database and means for managing networking operations between the control module and the operation module;
an electronic lock which includes a mechanical lock, means for automatically increasing a count of an electronic counter connected to a built-in battery every time the system is accessed, and at the same time sending an interrupt signal from the electronic lock to the database/networking controller each time the electronic lock is triggered, means for storing the interrupt signal in the database to thereby record a total number of accesses to the database, and means for displaying the count and the number recorded in the database and sounding an alarm if the count and number do not match;
a synchronous power supply controller which includes an uninterruptible power supply, means including a control switch for turning the system on and off, and means including a synchronous power switch for automatically connecting the system to the uninterruptible power supply when a normal power supply is off, and for automatically disconnecting the system from the uninterruptible power supply when the normal power supply comes on again;
an image output device for printing customized financial documents in response to commands received from the control module via the database/networking controller;
identification means including an integrated circuit card reader for inputting customer identification data, and means for comparing the customer identification data with identification data stored in the database;
a real-time recorder including means for recording identification codes, instruction commands, and an operation status of the system each time the system is accessed; and
authorization means for storing a customer's authorization information in the form of digital image information; and
wherein the operation module includes:
means including a display for displaying processing steps, prompts, and results of a financial operation;
means including an optical scanner for scanning image data and writing the scanned image data into the database;
means including a keyboard for inputting data;
means including a magnetic ink character reader for reading magnetic ink characters during a data input operation; and
a second processor for receiving data from the optical scanner, the keyboard, and the magnetic ink character reader, and for processing said data responsive to said database/networking controller.

2. A system for printing and processing financial documents as claimed in claim 1, wherein the database/networking controller comprises a plurality of central processing units which form a multiple-processor control system.

* * * * *